(12) United States Patent
Söderberg

(10) Patent No.: US 7,997,180 B2
(45) Date of Patent: Aug. 16, 2011

(54) MISSILE LAUNCHING SYSTEM, AND A HANGER MEMBER FOR SUSPENDING THE MISSILE IN A LAUNCH RAIL

(75) Inventor: Hans Söderberg, Linköping (SE)

(73) Assignee: SAAB AB, Linköping (SE)

( * ) Notice: Subject to any disclaimer, the term of this patent is extended or adjusted under 35 U.S.C. 154(b) by 136 days.

(21) Appl. No.: 12/399,727

(22) Filed: Mar. 6, 2009

(65) Prior Publication Data

US 2009/0223356 A1  Sep. 10, 2009

(30) Foreign Application Priority Data

Mar. 6, 2008  (EP) ..................... 08102336

(51) Int. Cl.
F41F 3/06 (2006.01)
B64D 1/04 (2006.01)

(52) U.S. Cl. ....................... 89/1.819; 89/1.54
(58) Field of Classification Search ............ 89/1.54, 89/1.819, 37.16, 37.19; 244/137.1
See application file for complete search history.

(56) References Cited

U.S. PATENT DOCUMENTS

| | | | |
|---|---|---|---|
| 2,981,150 A | | 4/1961 | Miller |
| 3,077,144 A | | 2/1963 | Barker et al. |
| 4,392,411 A | * | 7/1983 | Minkler ............... 89/1.819 |
| 4,660,456 A | * | 4/1987 | Griffin et al. ......... 89/1.819 |
| 4,711,151 A | * | 12/1987 | Griffin et al. ......... 89/1.805 |
| 4,750,404 A | * | 6/1988 | Dale .................... 89/1.819 |
| 4,856,409 A | * | 8/1989 | Bowden ............... 89/1.819 |
| 4,922,799 A | * | 5/1990 | Bartl et al. ........... 89/1.819 |
| 4,926,740 A | * | 5/1990 | Griffin et al. ........ 89/1.819 |
| 5,094,140 A | * | 3/1992 | Williams ............. 89/1.819 |
| 5,497,691 A | * | 3/1996 | Graham ............... 89/1.819 |
| 5,970,842 A | * | 10/1999 | Knapp et al. ......... 89/1.54 |
| 6,302,358 B1 | * | 10/2001 | Emsters et al. ...... 244/137.1 |
| 7,178,442 B2 | * | 2/2007 | Yogev .................. 89/1.59 |
| 7,540,227 B2 | * | 6/2009 | McCants Jr. ........ 89/1.819 |
| 2007/0068373 A1 | | 3/2007 | McCantas | |

FOREIGN PATENT DOCUMENTS

WO  WO-93/03321 A  2/1993
WO  WO-03/027598 A  4/2003

OTHER PUBLICATIONS

European Search Report—Sep. 17, 2008.

* cited by examiner

*Primary Examiner* — Bret Hayes
(74) *Attorney, Agent, or Firm* — Venable LLP; Eric J. Franklin

(57) ABSTRACT

A missile launching system including a launch rail for attachment to an aircraft and having a longitudinal slot, and at least two hangers for attachment to the missile at longitudinally spaced locations thereof and having a cross-section configured to be received in the longitudinal slot in the launch rail. The rearmost hanger includes two separable main parts, including a first main part for engagement with a respective lateral, first groove section of the slot, and a second main part configured to be attached to the missile and be slidably guided in a second groove section of the slot normal to the first groove section and opening towards the missile. The second main part includes laterally extending collars configured to interact in close proximity with respective rail sections facing the missile. The second main part is configured to separate from the first part when launching the missile.

10 Claims, 2 Drawing Sheets

US 7,997,180 B2

MISSILE LAUNCHING SYSTEM, AND A HANGER MEMBER FOR SUSPENDING THE MISSILE IN A LAUNCH RAIL

CROSS-REFERENCE TO RELATED APPLICATIONS

This application claims priority to European patent application 08102336.8 filed 6 Mar. 2007.

BACKGROUND OF THE INVENTION

The present invention relates to a missile launching system, comprising a launch rail for attachment to an aircraft and having a substantially T-shaped longitudinal slot, and at least two hanger members for attachment to the missile at longitudinally spaced locations thereof, at least the rearmost hanger member of which having a substantially T-shaped section configured to be received in the longitudinal T-slot in the launch rail.

The invention also relates to a hanger member for attachment to a rear section of a missile for suspending and guiding the missile in a longitudinal slot of a launch rail.

Missiles carried by and launched from an aircraft are usually slidably suspended in one or more longitudinally extending slots of a launch rail by means of so-called hangers attached to the top side the missile at longitudinally spaced locations thereof and having complementary shaped sections for slidably guiding the hangers in the slots, such that the hangers will take up loads in directions both towards the aircraft (compressive forces) and away from the aircraft (tensile forces) as well as lateral forces and torques about a longitudinal axis. Two or more, normally three, such hangers are attached to the missile. Such hangers could have a substantially T-shaped cross-section, possibly in combination with one or more C-shaped hangers. During launching of the missiles within normal launching envelopes the rearmost part of the missile may hit or contact the launch rail, when only the rearmost hanger is still engaging the guide track or slot in the rail and the missile is inclined away (diving) from the rail. The power of the rear part impact may vary depending on the launching condition, but many missiles are constructed to withstand such impacts within reasonable limits. However, some types of missiles are not permitted to let their rear parts come into contact with the launch rail for safety reasons. For example, this is true for missiles equipped with a sensitive power boost in their rear part which could be seriously damaged if contacting the rail too hard during launch.

In an attempt to solve this problem temporarily, the rearmost hanger was modified so as to provide supplementary laterally extending collars on a lower part of the hanger, which, although serving as a protection that prevents the rear part of the missile from contacting the rail, i.e. taking up compressive forces when only the rearmost hanger engages the rail track during launch, cannot take up tensile forces during ordinary flight time. Since this modified rear hanger is not capable of taking up tensile forces during normal flight time, due to the fact that this rear hanger lacks lateral flanges engaging side grooves in the launch rail, the hangers located in front thereof will be subjected to higher tensile loads which affects the durability and the allowed overall load applied to the missile, thereby reducing the safe transportation time for the missiles carried by an aircraft. A reason why the lateral flanges of the rearmost hanger, which take up tensile forces during the flight of the aircraft, are not suitable during missile launch, is that these lateral flanges tend to create an undesired hinge action at the rear hanger when the foremost hangers have been disengaged from their slots in the launch rail and the missile tends to dive, thereby causing the rearmost part of the missile to move upwardly and possibly hit the launch rail. Also, such a rear hanger may cause a jam problem while sliding in the corresponding tracks of the launch rail and cause a greater air resistance of the missile.

SUMMARY OF THE INVENTION

It is a primary object of the present invention to provide an improved structure of the rearmost hanger which eliminates the above-mentioned drawbacks of earlier proposals and which is capable of taking up both compressive forces and tensile forces acting on the missile during flights, while during launch of the missile being able to separate the part of the hanger that takes up the tensile loads. For this purpose the missile launch system of the kind mentioned in the introduction is characterized in that the rearmost hanger includes two separable main parts, i.e. a first main part for engagement with a respective lateral, first groove section of the T-slot, and a second main part configured to be attached to the missile and be slidably guided in a second groove section of the T-slot normal to the first groove section and opening towards the missile, said second main part having laterally extending collars configured to interact in close proximity with respective rail sections facing the missile. When launching the missile, the second main part is adapted to separate from the first part, which remains left on the launch rail, so that the missile may freely leave the launch rail as the foremost hangers have disengaged from their grooves in the rail, thereby minimizing the risk for an undesired contact between the rearmost section of the missile and the launch rail.

According to a suitable embodiment of the system of the invention the first and second main parts of the rearmost hanger are mutually detachably connected by a longitudinally extending dovetail joint. This will allow for a smooth separation of the hanger parts.

It is another object of the present invention to provide a hanger member for attachment to a rear section of a missile for suspending and guiding the missile in a longitudinal slot of a launch rail. The hanger member allows for a smooth separation of two hanger main parts and to prevent, or at least minimize, the risk for the rearmost section of the missile to come into contact with the launch rail during launch.

DETAILED DESCRIPTION OF A PREFERRED EMBODIMENT OF THE INVENTION

Figure 1:
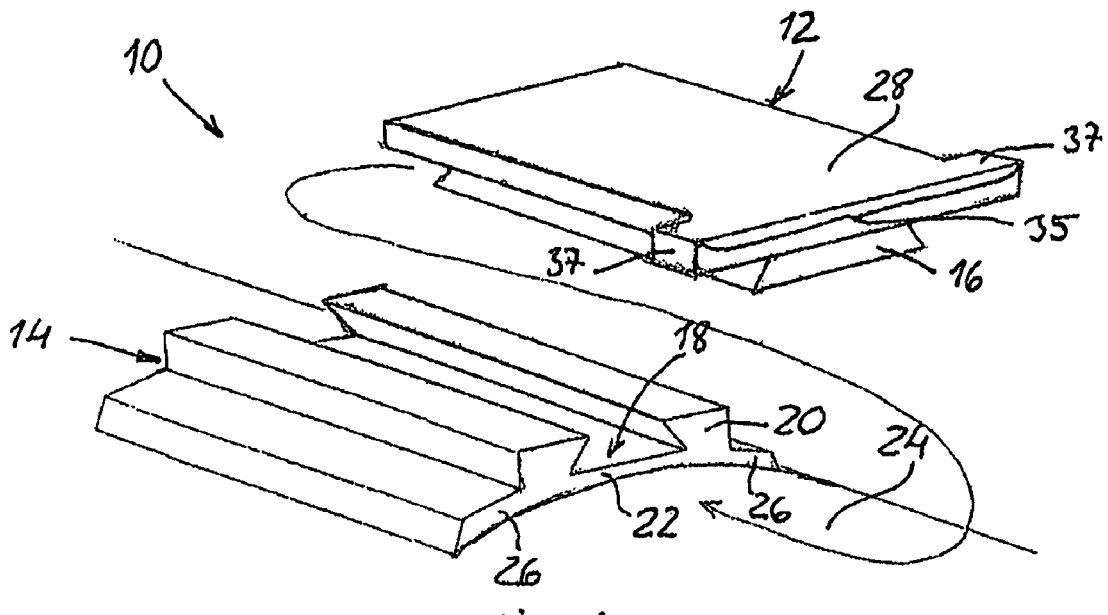
FIG. 1 is a perspective exploded view of a rear hanger for an aircraft missile launch system of the present invention.

FIG. 1 illustrates a rearmost hanger member 10 of an aircraft missile launch system of the invention in a disassembled condition. The hanger member 10 includes an upper main part 12 and a lower main part 14, which are mutually slidably connected by means of a longitudinally extending dovetail joint formed by a rib element 16 of a trapezoidal profile of the upper main part 12, and a correspondingly shaped groove 18 in a web portion 20 of the lower main part 14. Of course, other configurations of a longitudinal, separable joint between the parts 12, 14 are conceivable, such as a T-shaped joint or the like. The upper and lower parts 12, 14 may be detachably fixated to one another by any suitable locking means 13, such as a spring-loaded ball in one part which snaps into a corresponding recess in the other part. The locking force of these locking means are easily overcome when launching the missile. There are also provided any conventional, releasable snubbing mechanisms (not shown) which lock the missile to the launch rail in the longitudinal direction during flights.

Figure 2:
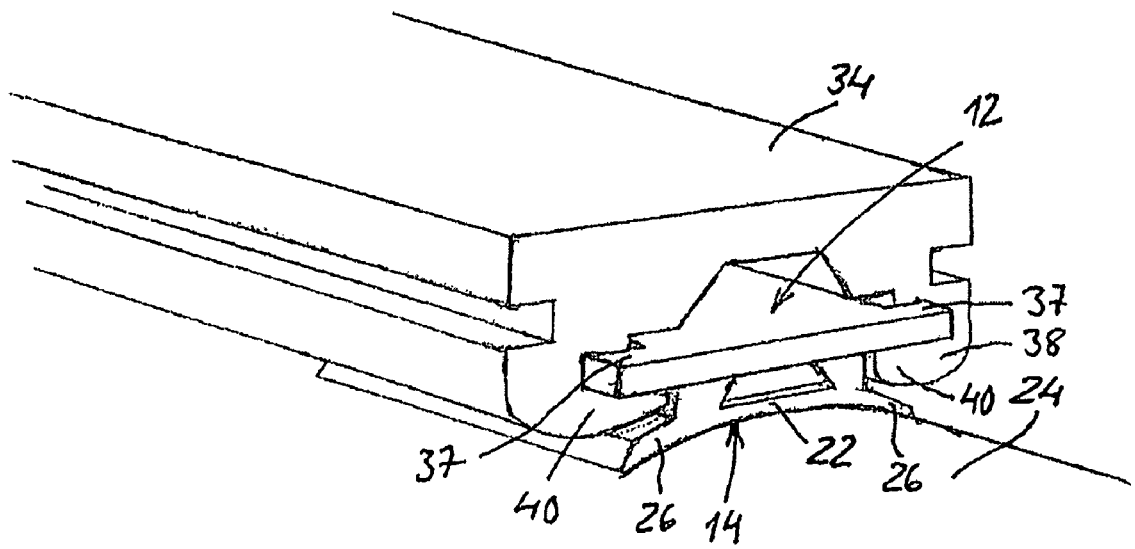
FIG. 2 is a perspective partial view of a rear end of the missile launch system of the invention with the rear hanger in its assembled state in a launch rail.
Figure 3:
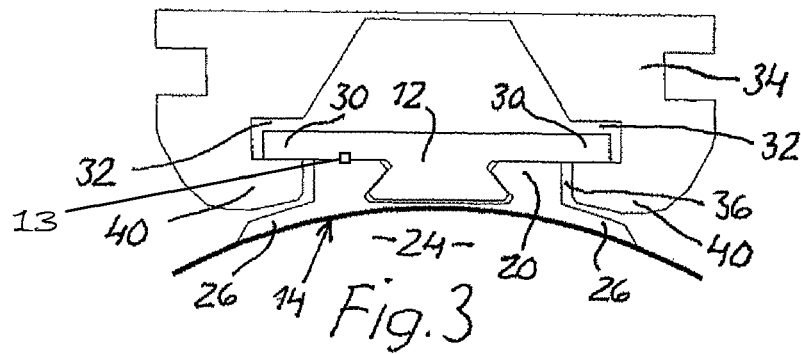
FIG. 3 is a cross-sectional view of the rear hanger of the invention inserted in a T-slot of the launch rail.

The lower part 14 has a curved foot portion 22, which is configured to be fixedly secured to the top of a rear section of the missile 24 and has laterally extending collars 26. The upper part 12 has a flat section 28 forming side wings 30 (FIG. 3) which slidingly fit into respective lateral groove sections 32 of a slot having a substantially T-shaped section in a typical launch rail 34 (FIGS. 2 and 3), in which the missile 24 is suspended by means of preferably three hanger members attached to the missile 24 at longitudinally spaced locations thereof. The web portion 20 of the lower hanger part 14 is guided in a groove section 36 of the T-slot normal to the lateral groove sections 32 and opening towards the missile 24. A rear end of the flat section 28 has a widened portion 35 which form two laterally protruding stop lugs 37 configured to engage a rear end surface 38 of the launch rail 34 in order to prevent a movement forwardly of the upper part 12 when launching the missile 24. Further suitable locking means (not shown) may be configured to securely hold the upper part 12 attached to the rail 34 before, during and after missile launch.

In the missile launch system of the invention the foremost (normally two) hanger members (not shown) are formed as conventional integral T-hangers (possibly one C-hanger) both during flights and launch, whereas the rearmost hanger member 10 of the present invention is formed as a T-hanger during ordinary flights only, so that all three hanger members can jointly take up both tensile and compressive forces as well as lateral forces and torques about the longitudinal axis exerted by the missile 24 during ordinary flights. However, in order to prevent, or at least minimize, the risks of an impact of the rearmost part of the missile 24 and the launch rail 34 during missile launch, due to a diving movement of the missile when the two foremost hangers have left the guide slot in the rail, the rear hanger member 10 is caused to change its structure by separating the lower hanger part 14 from the upper part 12 in such a manner, that the upper part 12 is prevented from follow the lower part 14 during the launch of the missile 24, since the stop lugs 37 engage the rear end surface 38 of the rail 34, as seen in FIG. 2 and FIGS. 4*a-c*. Although still allowing a lateral guidance in the groove section 36 of the rail slot, the lower part 14 permits the missile 24 to fall out freely from the rail 34, thereby obviating a hinge-like action influenced by the structure of an entraining upper hanger part 12 which could bring the rearmost part of the missile 24 to move into contact with the rail 34. The laterally extending collars 26 of the lower hanger part 14 are configured to closely co-act with adjacent rail flanges 40 for taking up any compressive forces exerted by the missile 24 on the rail 34 during flight and missile launch. They also greatly reduce the risk of a collision between the rearmost part of the missile and the launch rail 34.

Figure 4A:
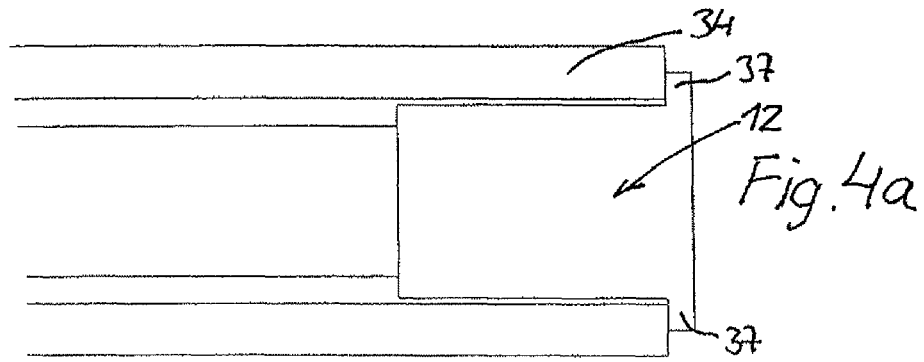
FIGS. 4a-4c are three top plan sequential views showing the separation of the lower hanger part from the upper hanger part during missile launch.
Figure 4B:
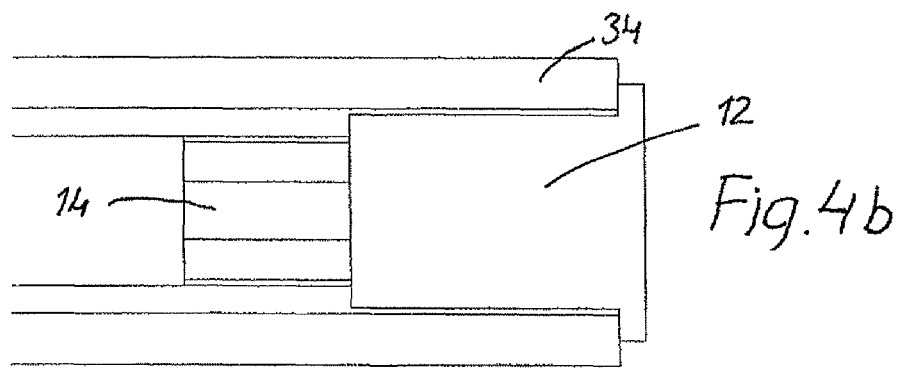
Figure 4C:
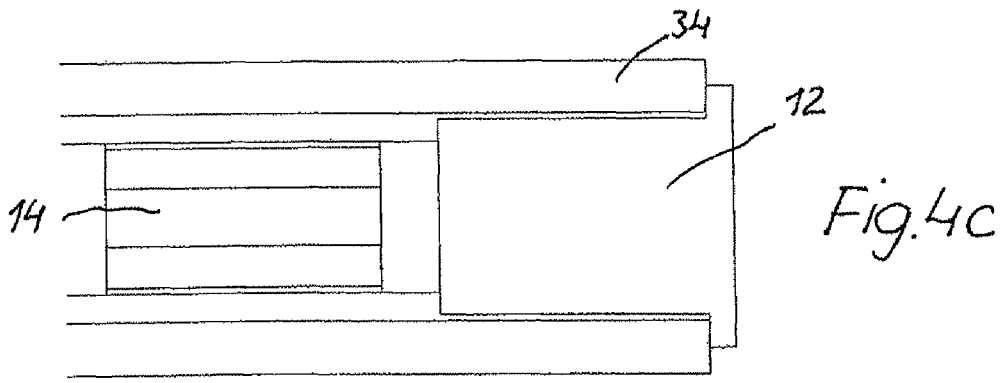

FIGS. 4*a*-4*c* illustrate the sequential separation steps of the rear hanger member 10 during the beginning of missile launch. FIG. 4*a* shows the unseparated state of the rearmost hanger member 10 in the launch rail, whereas FIGS. 4*b* and *c* illustrate a partly separated and a fully separated state, respectively.

Although the missile launch system and the associated hanger member of the present invention are primarily useful for launchers mounted to an aircraft, it should be understood that the invention could be equally applicable to launchers mounted to land vehicles, ships or stationary ground installations, even though the problem forming the basis of the present invention is not as great as in airborne systems. Therefore, the phrase "for attachment to an aircraft" should not be interpreted in a limiting sense.

The invention claimed is:

1. A missile launching system, comprising:
   a launch rail configured to be attached to an aircraft, the launch rail comprising a substantially T-shaped longitudinal slot, and
   at least two hanger members configured to be attached to a missile at longitudinally spaced locations, at least a rearmost hanger member of the at least two hanger member comprising a substantially T-shaped section configured to be received in the substantially T-shaped longitudinal slot in the launch rail,
   wherein the rearmost hanger member comprises two separable main parts, the two separable main parts comprising a first main part configured to engage a respective lateral, first groove section of the substantially T-shaped longitudinal slot, and a second main part configured to be attached to the missile and be slidably guided in a second groove section of the substantially T-shaped longitudinal slot normal to the first groove section and opening towards the missile, said second main part comprising laterally extending collars configured to interact in close proximity with respective rail sections facing the missile, said second main part being configured to separate from the first part when launching the missile.

2. The missile launching system according to claim 1, wherein the first and second main parts of the rearmost hanger member are detachably interconnected by a longitudinally extending dovetail joint.

3. The missile launching system according to claim 1, further comprising:
   a lock configured to hold the first and second main parts releasably together.

4. The missile launching system according to claim 1, wherein the first main part comprises a stop configured to prevent the first main part from moving forwardly when launching the missile.

5. The missile launching system according to claim 4, wherein the stop comprises a widened portion of the first main part configured to engage a rearwardly facing surface of the launch rail.

6. A hanger member for attachment to a rear section of a missile for suspending and guiding the missile in a longitudinal slot of a launch rail comprising a substantially T-shaped longitudinal slot, the hanger member comprising:
   two separable main parts comprising a first main part configured to engage a respective lateral, first groove section of the substantially T-shaped longitudinal slot, and a second main part configured to be attached to a missile and be slidably guided in a second groove section of the substantially T-shaped longitudinal slot normal to the first groove section and opening towards the missile, said second main part comprising laterally extending collars configured to interact in close proximity with respective rail sections facing the missile, said second main part being configured to separate from the first part when launching the missile.

7. The hanger member according to claim 6, wherein the first and second main parts of the hanger member are detachably interconnected by a longitudinally extending dovetail joint.

8. The hanger member according to claim 6, further comprising:
a lock configured to hold the first and second main parts releasably together.

9. The hanger member according to claim 6, wherein the first main part comprises a stop configured to prevent the first main part from moving forwardly when launching the missile.

10. The hanger member according to claim 9, wherein the stop comprises a widened portion of the first main part configured to engage a rearwardly facing end surface of the launch rail.

* * * * *